United States Patent
Hsiao (10) Patent No.: US 10,556,390 B2
(45) Date of Patent: Feb. 11, 2020

(54) APPARATUS AND METHOD FOR DIRECTIONAL ALIGNMENT OF NANOFIBERS IN A POROUS MEDIUM

(71) Applicant: UNIVERSITY OF SOUTH ALABAMA, Mobile, AL (US)

(72) Inventor: Kuang-ting Hsiao, Spanish Fort, AL (US)

(73) Assignee: University of South Alabama, Mobile, AL (US)

( * ) Notice: Subject to any disclaimer, the term of this patent is extended or adjusted under 35 U.S.C. 154(b) by 419 days.

(21) Appl. No.: 15/313,350

(22) PCT Filed: May 28, 2015

(86) PCT No.: PCT/US2015/033000
§ 371 (c)(1),
(2) Date: Nov. 22, 2016

(87) PCT Pub. No.: WO2015/184151
PCT Pub. Date: Dec. 3, 2015

(65) Prior Publication Data
US 2017/0182718 A1  Jun. 29, 2017

Related U.S. Application Data

(60) Provisional application No. 62/003,982, filed on May 28, 2014.

(51) Int. Cl.
*B29C 70/08* (2006.01)
*B29K 105/12* (2006.01)
(Continued)

(52) U.S. Cl.
CPC ............ *B29C 70/081* (2013.01); *B29C 70/02* (2013.01); *B29C 70/025* (2013.01); *B29C 70/06* (2013.01);
(Continued)

(58) Field of Classification Search
CPC ....... B29C 70/02; B29C 70/025; B29C 70/06; B29C 70/08; B29C 70/081; B29C 70/12;
(Continued)

(56) References Cited

U.S. PATENT DOCUMENTS

| 5,641,366 A | 6/1997 | Hohman |
| 2002/0185770 A1 | 12/2002 | McKague |

(Continued)

FOREIGN PATENT DOCUMENTS

| JP | 2007098918 | 9/2008 |
| JP | 2006274211 | 6/2009 |

(Continued)

OTHER PUBLICATIONS

You (KR-20130033745-A, machine translation KR to ENG) (Year: 2013).*

*Primary Examiner* — Joseph S Del Sole
*Assistant Examiner* — Lawrence D. Hohenbrink, Jr.
(74) *Attorney, Agent, or Firm* — Maynard Cooper & Gale, P.C.; Jon E. Holland (57) ABSTRACT

A method and apparatus for uniformly and directionally aligning and stretching nanofibers inside a porous medium is described. The nanofibers may include nanotubes, nanowires, long-chain polymer molecules or likewise. Porous medium may include a porous layer, fabric, or composite prepreg or likewise. According to one embodiment, an apparatus for directional alignment of nanofiber in a porous medium includes a fluid matrix with nanofibers. A porous medium is provided as well as a device for forcing the fluid matrix radially through the porous medium.

21 Claims, 8 Drawing Sheets

(51) Int. Cl.
 *B29C 70/50* (2006.01)
 *B29C 70/02* (2006.01)
 *B29C 70/12* (2006.01)
 *B29C 70/24* (2006.01)
 *B29K 105/14* (2006.01)
 *B29C 70/06* (2006.01)

(52) U.S. Cl.
 CPC .............. *B29C 70/08* (2013.01); *B29C 70/12* (2013.01); *B29C 70/24* (2013.01); *B29C 70/50* (2013.01); *B29C 70/504* (2013.01); *B29K 2105/124* (2013.01); *B29K 2105/14* (2013.01)

(58) Field of Classification Search
 CPC ....... B29C 70/24; B29C 70/50; B29C 70/504; B29K 2105/124; B29K 2105/14
 USPC ........................................ 264/108; 427/428.1
 See application file for complete search history.

(56) References Cited

U.S. PATENT DOCUMENTS

| | | |
|---|---|---|
| 2003/0227243 A1 | 12/2003 | Perlo et al. |
| 2006/0047052 A1* | 3/2006 | Barrera ................. B82Y 30/00 524/495 |
| 2007/0190880 A1 | 8/2007 | Dubrow et al. |
| 2008/0176470 A1 | 7/2008 | Filip et al. |
| 2010/0233812 A1 | 9/2010 | Sun et al. |
| 2010/0331980 A1 | 12/2010 | Lee et al. |
| 2011/0169190 A1* | 7/2011 | Miller ................... B29C 70/443 264/257 |
| 2014/0044865 A1 | 3/2014 | Haick et al. |

FOREIGN PATENT DOCUMENTS

| | | |
|---|---|---|
| JP | 2010536706 | 4/2014 |
| JP | 2010527302 | 9/2014 |
| KR | 20130033745 | 4/2013 |
| KR | 20130033745 A * | 4/2013 |

\* cited by examiner

APPARATUS AND METHOD FOR DIRECTIONAL ALIGNMENT OF NANOFIBERS IN A POROUS MEDIUM

CROSS REFERENCE TO RELATED APPLICATION

This is the national stage application of and claims priority to International Application No. PCT/US2015/033000, entitled "Apparatus and Method for Directional Alignment of Nanofibers in a Porous Medium" and having an international filing date of May 28, 2015, which is incorporated herein by reference. International Application No. PCT/US2015/033000 claims priority to U.S. Provisional Patent Application No. 62/003,982, entitled "Apparatus and Method for Directional Alignment of Nanofibers in a Porous Medium" and filed on May 28, 2014, which is incorporated herein by reference.

FIELD OF THE DISCLOSURE

The present disclosure relates to aligning and stretching nanofibers in porous medium. The nanofibers include nanotubes, nanowires, long-chain polymer molecules or likewise. The porous medium may include a porous layer, fabric, or composite prepreg or likewise. In particular, in accordance with one embodiment, the disclosure relates to an apparatus for directional alignment of nanofibers in a porous medium including a fluid matrix with nanofibers, a porous medium and a device for forcing the fluid matrix through the porous medium in a particular fluid mechanics manner such that the nanofibers are stretched and aligned in a preferred direction.

RELATED ART

A composite is a material combined from two or more different constituent materials. The constituent materials may have significantly different physical or chemical properties and remain distinct from each other in the composite material. On the other hand, the macroscopic properties of the composite after being combined become different from any individual constituent materials and are governed by the interaction of the constituent materials and their response to external loading, excitation, or environmental changes. With an appropriate combination of various constituent materials, the composite material can perform significantly better than any of the individual constituent materials in the targeted physical or chemical functions.

Fiber Reinforced Composites

Fiber reinforced composites are a common class of composites. A fiber reinforced composite typically comprises two components: the fiber reinforcement system and the matrix. The fiber reinforcement system is a group of fibers that are arranged in desired patterns to reinforce the composite. The matrix is used to bond the fibers together and transfer load among fibers. Common matrices are thermoset resin (such as epoxy), thermoplastic resin (such as PEEK), ceramics, and metals. Common fiber reinforcements are carbon fibers, glass fibers, metallic fibers, aramid fibers, and natural fibers. Most of the fibers have diameters larger than 3 micrometers (namely, microfibers). Recent developments in nanotechnology have produced many new fibers (namely, nanofibers) with diameters ranging from one nanometer to less than one micrometer. The nanofibers can be carbon based (carbon nanotubes, carbon nanofiber, carbon nanowires), metal based, or ceramic based, etc.

In many performance-driven applications, fiber reinforced composites are manufactured into laminates. In a laminate, the fibers are orientated in the in-plane direction of the laminate in order to maximize the mechanical properties of the product. However, the mechanical properties in the out-plane direction (i.e., hereto defined as "z-direction") of the composite laminate are relatively weak as the matrix is the major load bearing system in the out-plane direction (i.e., z-direction) of the composite. To further enhance the in-plane performance of the laminate, it is preferable that the fibers be continuous instead of short and discontinuous fibers. Typically, continuous fibers are microfibers since the technology for manufacturing continuous microfibers is very mature. Such continuous fiber reinforced composites are commonly used in aerospace, marine industries, wind turbines, and other applications which demand high strength lightweight composite materials.

Manufacturing of Composites

The process of composite manufacturing includes (1) integrating the fiber reinforcement system and the matrix, and (2) forming the composite laminate into the desired geometry. Generally, the fiber system is supplied as fiber tows (each tow contains approximately 2000-10000 microfibers), fiber fabric (formed by many fiber tows), or fiber preform (where fiber tows are woven into three-dimensional geometry). The matrix (such as epoxy) is turned into fluid phase and then allowed to gradually flow into the open space in the fiber system and saturate the fiber system. During this matrix saturation process, the solid fiber system is treated as a "porous medium" that allows the fluid matrix and air to flow through it and fill the pore space inside the porous medium. After the matrix completely saturates the fiber system, the matrix can be converted into a solid and the composite formed into any desired geometry within a mold.

For thermoset resin matrices, another alternative method of forming the composite includes half-reacting (half-curing) the thermoset matrix and forming the fiber/half-cured matrix into "prepreg". The half-cured matrix prepreg is rubber-like at room temperature and becomes liquid at a heated temperature. The prepreg is typically covered on both sides with a protective film and stored in a freezer to delay the further cure-reaction and to extend the shelf-life of the prepreg. To convert the prepreg into a final composite laminate part, one simply cuts and stacks the desired layers of prepreg on a mold and applies heat to complete the cure reaction of the matrix so the matrix reaches its full strength due to the maximum level of cross-linking among its polymer molecules. The prepreg process can also be applied to thermoplastic composites.

Failure

A composite, as described above, can fail due to any of the following micro-mechanical reasons: (1) fiber breakage, (2) matrix breakage, (3) fiber/matrix interface failure, and (4) fiber micro-buckling. If a tensile force is applied to the composite laminate along the fiber alignment direction, i.e., the in-plane direction of the laminate, the composite laminate typically will not fail until the stress reaches the fiber breakage limit. This is the ideal theoretical strength of the composite laminate. However, in reality, the stress may not be perfectly aligned with the fiber direction. For instance, if the stress is acting in the out-plane direction of the laminate, the failure will occur as evidenced by matrix breakage and fiber/matrix-interface failure. Such a failure scenario is commonly observed between the plies of laminae of a composite laminate. If the failure is between two plies of laminae, it is also called interlaminar failure.

Further, if a compressive stress is applied along the fiber direction, fiber micro-buckling can happen before the fiber breaks due to compression. The lack of out-plane direction support is one of the reasons for composite laminate weakness in terms of matrix breakage, fiber/matrix interface failure, and fiber micro-buckling. Besides the micro-mechanical failures, a composite can also fail due to thermal degradation that is typically related to degradation of the matrix and the fiber/matrix interface.

Prior art solutions to these problems exist and are exemplified by U.S. Patent Pub. No. 20070128960, U.S. Pat. Nos. 7,537,825, and 7,832,983. The first proposes to grow nanotubes on a medium and then bond it with the composite. The next proposes sandwiching a carbon nanotube between two composite laminates and the third proposes to coat individual carbon filaments of the tow or yarn with nano reinforcement materials. None of these references describes a composite that is reinforced in its weakest plane in a predictable and repeatable manner.

Another prior art document, U.S. Pat. No. 7,867,468, proposes feeding a fibrous substrate through a solution containing carbon nanotubes (i.e., CNT Dispersion) and applying a DC electric field to attract and deposit the carbon nanotubes onto a carbon fiber fabric that is connected to the positive terminal. According to this patent, the CNT is deposited on the carbon fibers with no alignment after the deposition step. However, an additional optional step can be applied where the carbon fibers and the CNT deposition are exposed to approximately 1 1-4 kV/cm electric field for about 2 to 4 hours to induce the deposited CNTs to reorient themselves substantially perpendicular to the length of the carbon fibers. The CNT length is about 200 nanometers to 10 micrometers. This prior art addressed the need to use CNTs to enhance the out-of-plane properties of carbon fiber composites. However, the process described can only deposit the CNTs on the surface of carbon fiber fabric as the carbon fiber fabric is conductive and there is no electrical field inside the conductive fabric for moving or aligning the CNTs if any CNTs could accidentally pass the surface of the carbon fiber fabric. In other words, it can (1) only be used to align CNTs for a very thin carbon fiber fabric as shown in FIG. 3A and FIG. 3B of this prior art, or (2) sacrifice the CNTs deposition and alignment quality inside a thick carbon fiber fabric. As a result, this conventional approach requires many steps and is time consuming and inefficient for mass production. Furthermore, it appears that alignment only occurs for CNTs of a length ranging from about 200 nanometers to about 10 micrometers. As the carbon fiber diameter is about 5-7 micrometers and glass fiber diameter is about 10-30 micrometers, the short CNTs aligned on the surface of carbon fibers may be good to form "fussy fabric" but cannot effectively and uniformly stitch through a thick carbon fiber fabric that has thickness in about 0.1-1 millimeter range. Furthermore, the electrical field, the conductive fibers (e.g., carbon fibers), conductive nanotubes (e.g., carbon nanotubes), and relatively non-conductive matrix (e.g., epoxy, non-conductive polymer) are required for this prior art to work. Such electrical field driven deposition and alignment likely will not be applicable to general composites cases. For example, the conventional approach will not likely work if (1) the nanotubes are replaced with are non-conductive nanofibers; (2) the carbon fiber fabric is too thick to allow useful electric field inside the fabric; (3) the carbon fibers are replaced with non-conductive Kevlar fibers; (4) the matrix in which the CNT dispersed is conductive (such as some conductive polymers or the matrix is further modified with silver particles or some ionic additives); or (5) the fluid is too viscous for the electrical-field to move the conductive nanofibers (e.g., carbon nanotubes). For issue (5), one might consider continuing to increase the electrical field. However, all materials have an electrical breakdown limit (i.e., dielectric strengths), so it is not always feasible to increase the electric field. Nevertheless, a person familiar with the composites materials industry may find many general multiscale composite cases where electrical-field driven deposition and alignment will not work. A desired robust and efficient method for uniformly stitching nanotubes or nanofibers through a thick porous medium (such as a thick fiber fabric) is generally desired.

Thus, it is an object of this disclosure to provide robust, efficient, and mass-production-friendly apparatus and methods for directionally aligning nanofibers in a porous medium which are flexible and adjustable to fit the requirements of any composite material so as to create composites significantly more resistant to failure. This technology can be used for composite materials production but may also be applied to any other applications that may benefit from nanofiber alignment inside a porous medium.

SUMMARY

According to one embodiment, an apparatus for directional alignment of nanofibers in a porous medium includes a fluid matrix with nanofibers. A porous medium is provided, as well as a device for forcing the fluid matrix radially through the porous medium. The fluid flow moves and aligns the nanofibers in the porous medium such that uniform distribution and alignment of nanofibers inside the porous medium is achieved even if the porous medium is thick.

All terms used herein are given their common meaning. A "porous medium" is generally a material that includes spaces and through which other mediums may pass. In one example, a sponge is a porous medium that absorbs fluid and through which fluid may pass, for example only. The terms "radially" and "radial flow" are used to describe movement or flow in a rigorously defined "radial manner." As known in the art, the term "radial manner" generally refers to the following: In a circle related coordinates system, such as a cylindrical coordinates system or spherical coordinates system, the local velocity can be mathematically decomposed into radial velocity component and non-radial velocity components (such as tangential velocity component and axial velocity component in the cylindrical coordinates). Said "radial manner" generally refers to the ratios of the non-radial velocity components to the radial velocity component and are limited to (i.e., no greater than) a "small value." Theoretically, the presently described method will function best if said small value approaches to a value from about zero to about 0.3 so the radial component is always dominating and hence the alignment can be well controlled by the non-radial components as the fluid flowing through and inside the porous medium. However, other values outside of this range are possible. A well-controlled radial flow can be either "convergent flow" or "divergent flow". Based on fluid mechanics, a "convergent flow" stretches a fluid element as well as the nanofibers along the radial direction while a "divergent flow" stretches a fluid element as well as the nanofibers along the tangential direction. The stretching action will also align the nanofibers in the same stretching direction. Such radial flow behavior and its alignment and stretching effect will not be limited by any electrical properties of the nanofibers, the fluid, or the porous medium. In addition, such flow behavior and the alignment and stretching effect will continue inside the porous medium and will not fade out when a thick porous medium is used.

Another aspect of the disclosure is that such flow behavior and its alignment and stretching are not reduced even when the fluid is very viscous. Hence, the apparatuses and methods described herein are very effective and efficient for achieving nanofiber alignment in porous medium. Devices with curved surfaces have radiuses. When a porous medium is conformed to a device with a radius, fluid will pass "radially" through the conformed portion of the porous material when used in conjunction with a device for forcing such radial flow through the porous material, as will be described and disclosed more fully hereafter. Note that said device may generate radial flow, indicated previously as "radial manner," in more than one portion of the apparatus, for instance at (1) the "pre-alignment zone," defined herein as the area outside of and adjacent to the porous medium, and (2) the targeted porous medium zone, defined herein as the area inside the conformed portion of the porous media. Theoretically, the "radial flow" pattern is desirable as flow patterns other than those occurring inside the conformed portion of the porous media may negatively affect the alignment of nanofibers. However, in some embodiments, it is acceptable to have the "majority" of the fluid entering and flowing inside the conformed portion of the porous media satisfying the "radial flow." As used herein, the "majority" is defined as at least 70% of the radial flow occurring inside the conformed portion of the porous media, though other flow amounts are possible in other embodiments. In an additional embodiment, the "radial flow" starts at a "minimum pre-alignment distance" before the fluid entering the conformed portion of the porous media. As used herein, "minimum pre-alignment distance" is at least one-quarter of the thickness of the conformed portion of the porous media or the length of nanofiber, whichever is smaller. This "minimum pre-alignment distance" helps to ensure that the nanofibers are pre-aligned before entering the targeted porous medium portion.

In one aspect of this disclosure, the porous medium is a microfiber fabric. As discussed previously, "micro fiber fabric" is any material comprised of small fibers. Technically, "micro" refers to fibers in the range of about 1-300 micrometers in diameter, for example only, and "nano" fibers refers to fibers approximately 0.001-0.99 micrometers in diameter. As used here, "micro fiber fabric" can include either or both or any other micro fiber now known or hereafter developed. In one embodiment, the nanofibers are forced through the porous medium in a Z direction, which is in a direction that is perpendicular to surface plane of the micro fiber fabric.

In another aspect, the device for forcing the fluid matrix through the porous medium includes an outer flow device containing a fluid matrix and a permeable shaping tool with a radius where the fluid matrix passes radially through the porous medium into the permeable shaping tool. In another aspect, a rigorously defined radial flow pattern is established such that the majority of fluid matrix flows inside the porous medium. Further, a rigorously defined radial flow pattern is established before the majority of the fluid matrix enters the porous medium. Additionally, a rigorously defined radial flow pattern is established at least a minimum pre-alignment distance before the fluid matrix enters the porous media. In one aspect, the radial flow is rigorously defined in terms of fluid mechanics and is defined as a flow pattern with the ratios of the non-radial components to the radial component are limited to (i.e., no greater than) a "small value," though other values are possible.

In a further aspect of the present disclosure, the outer flow device comprises a tank containing the fluid matrix. A permeable shaping tool, which can be movable or stationary, may have any cross section geometry such as, but not limited to, a full circle arc, a half circle arc, a three quarter circle arc, etc. In one embodiment, the permeable shaping tool provides an arc surface with a radius which is directly or indirectly connected with the porous medium. In one embodiment, the shaping tool is an arc-shaped (e.g., cylindrical) roller that rotates to facilitate movement of the porous medium. In an additional embodiment, the shaping tool may have an inconsistent or varying diameter. The shaping tool is positioned in the tank such that the porous medium enters the tank where it curves around and is movably connected with the outer curved surface of the shaping tool. The porous medium exits the tank after deposition of the nanofibers into the porous medium. Further, the interior of the shaping tool may be at a lower pressure than that of the fluid matrix in the tank such that the fluid matrix flows radially through the porous material into the permeable shaping tool.

In another aspect, the outer flow device comprises an impermeable layer and a layer impregnated with the fluid matrix. Herein the "layer" means a sheet-like material. Examples include, but are not limited to, plastic film, wax paper, rubber sheet, fabric, thin sponge cloth, etc.

In one aspect, the permeable shaping tool includes a flow dispersion and absorption layer and a shaping tool. In one embodiment, the shaping tool may comprise an arc shaped tool having a radius. In an additional embodiment, the shaping tool is an arc-shaped roller that rotates to facilitate movement of the porous medium. The shaping tool can be movable or stationary and can be any cross sectional geometry, such as, but not limited to, a full circle arc, a half circle arc, a three quarter circle arc, etc. The geometry of the shaping tool provides a surface with a radius which is directly or indirectly in contact with the porous medium. In one embodiment, the shaping tool may have an inconsistent or varying diameter.

In one aspect, the device for forcing the fluid matrix through the porous material comprises permeable shaping tool with a radius, where the permeable shaping tool contains the fluid matrix. In this embodiment, the porous medium conforms to the curved surface as it passes, and the fluid matrix passes from the permeable shaping tool through the porous medium. In one aspect, the device for forcing the fluid matrix through the porous medium further includes an outer flow device connected with the porous medium such that the fluid matrix passes through the porous medium into the outer flow device.

According to a further aspect of the present disclosure, the device for forcing the fluid matrix through the porous material includes an arc-shaped permeable shaping tool with a radius and a layer impregnated with the fluid matrix. The porous medium comes into contact with the arc-shaped permeable shaping tool so as to conform to the curved surface. In an additional embodiment, the porous medium is movably connected with the layer impregnated with the fluid matrix along the radius such that the fluid matrix flows radially through the porous medium. In one aspect, this device further includes a flow dispersion and absorption layer where the porous medium passes around the layer impregnated with the fluid matrix and in between the flow dispersion and absorption layer.

According to an additional embodiment of the disclosure, an apparatus for directional alignment of nanofiber in a porous medium includes a tank for holding a fluid matrix with nanofibers. A porous medium and at least one permeable shaping tool, for example an arc-shaped device with a radius, are provided where the porous medium enters the tank and passes at least partially around the permeable shaping tool. The porous medium conforms at least partially to the curved surface of the shaping tool such that the fluid matrix passes radially through the porous medium. The porous medium then exits the tank, and a collector is provided upon which the fluid matrix impregnated porous medium is collected. In another aspect, a rigorously defined radial flow pattern is created so as to ensure that the majority of fluid matrix flows inside the porous medium. Further, a rigorously defined radial flow pattern is created in the area located outside of and adjacent to the porous medium. A rigorously defined radial flow pattern is creates at least a minimum pre-alignment distance before the fluid matrix enters the porous media. In one aspect, the radial flow is rigorously defined as a flow pattern where the ratios of the non-radial components to the radial component are limited to (i.e., no greater than) a "small value," though other values are possible.

In another aspect, the disclosure further includes a protective film applicator for applying a protective film to the fluid matrix impregnated porous medium. In one aspect, the disclosure further includes a compression device for squeezing excess fluid matrix from the porous medium after exiting the tank.

In a further aspect, the porous medium is a microfiber fabric and the nanofibers are forced through the porous medium in the Z direction, i.e., the direction perpendicular to the surface plane of the microfiber fabric. In one aspect, the tank is pressurized such that the pressure within the tank is greater than the pressure in the interior of the permeable shaping tool, thereby causing a fluid matrix to flow from the tank through the porous medium and into the at least one permeable shaping tool. In one aspect, the length of the nanofiber is at least 5 times of the diameter of the microfiber, though other lengths are possible.

In another aspect, the at least one permeable shaping tool also contains the fluid matrix with nanofibers, and the pressure of the interior of the at least one permeable shaping tool is greater than the pressure of the tank, such that the fluid matrix flows outward radially from the interior of the permeable shaping tool through the porous medium and into the tank. In one aspect, there are more than two permeable shaping tools.

According to another embodiment of the present disclosure, a method for directional alignment of nanofiber in a porous medium comprises the steps of providing a fluid matrix with nanofibers; conforming a porous medium to a surface of a shaping tool; and forcing the fluid matrix to flow through the porous medium radially. In another aspect, a rigorously defined radial flow pattern is provided so that a majority of fluid matrix flows inside a conformed area of the porous medium. Further, a rigorously defined radial flow pattern is established before the majority of the fluid matrix enters the porous medium. In addition, a rigorously defined radial flow pattern is established at least a minimum pre-alignment distance before the fluid matrix enters the porous media. In one aspect, the radial flow is defined as a flow pattern with the ratios of the non-radial components to the radial component are limited to (i.e., no greater than) a "small value."

In one aspect of the method, the porous medium is a microfiber fabric and the nanofibers are forced through the porous medium in the Z plane direction that is perpendicular to the surface plane of the microfiber fabric. In an additional aspect, the device for forcing the fluid matrix through the porous medium comprises an outer flow device containing the fluid matrix and an permeable shaping tool with a radius where the porous medium passes between the outer flow device and the permeable shaping tool and the fluid matrix flows radially through the porous medium into the permeable shaping tool.

In yet another aspect of this disclosure, the device for forcing the fluid matrix through the porous material comprises a permeable shaping tool with a radius wherein the permeable shaping tool contains the fluid matrix and where the porous medium conforms to the radius as it passes by the permeable shaping tool and the fluid matrix passes radially from the permeable shaping tool through the porous medium.

DESCRIPTION OF THE DRAWINGS

Other objects, features and advantages of the present disclosure will become more fully apparent from the following detailed description of the preferred embodiment, the appended claims and the accompanying drawings in which:

DETAILED DESCRIPTION

Embodiments of the present disclosure are illustrated by way of example in FIGS. 1-11. With specific reference to FIGS. 1 and 2, an apparatus 10 for directional alignment of nanofibers in a porous medium 18 includes a fluid matrix 12 including nanofibers 14 contained within outer flow device 16. It should be noted that all terms used herein are given their common meaning as known in the art as and further described and discussed hereafter. Porous medium 18 is any material that is capable of receiving something into itself, again as will be described more fully hereafter.

Figure 1:
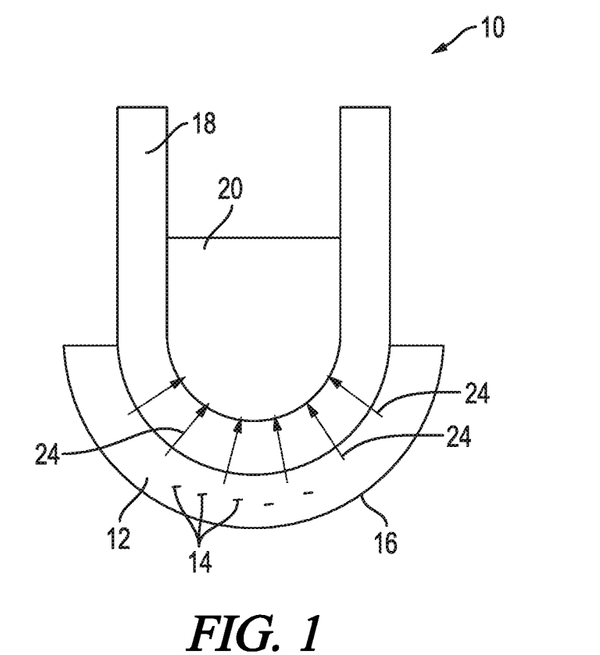
FIG. 1 is a schematic diagram of an apparatus for directional alignment of nanofibers in a porous medium according to one embodiment in which the flow is converging radial flow.

Referring specifically to FIG. 1, the apparatus for directional alignment of nanofiber in a porous medium 18 includes a permeable shaping tool 20 that draws fluid matrix 12, including nanofibers 14, from outside of the shaping tool 20, such as from outer flow device 16 through porous medium 18. With reference to FIG. 1, the outer flow device 16 is an apparatus that may contain or hold the fluid matrix 12 containing nanofibers 14 before they enter the permeable shaping tool 20. In one embodiment the outer flow device 16 may comprise a tank (not shown) that holds or contains the fluid matrix 12 with nanofibers 14. Other types of receptacles may be utilized to hold the fluid matrix 12, for instance a sponge.

The permeable shaping tool 20 is a structural device that contacts the porous medium 18 as it is being drawn past a surface of the shaping tool 20 while a source introduces a fluid matrix 12 containing nanofibers 14. In one non-limiting embodiment, the source of fluid matrix 12 containing nanofibers 14 may be a fluid matrix bath through which the porous medium 18 is drawn as it is contacting the shaping tool 20. In an additional embodiment, the source of fluid matrix 12 containing nanofibers 14 may comprise other structures, such as a sponge that has been impregnated with the fluid matrix 12. In other embodiments, other types of sources of the fluid matrix are possible.

The shaping tool 20 acts to both force the fluid matrix 12 through the porous medium 18 and control the shape of the porous medium 18 as it is impregnated with the nanofibers 14. In one embodiment, the permeable shaping tool 20 is arc shaped, providing a smooth surface that will not rip or tear porous medium 18 as it comes into contact with the fluid matrix 12. Other shapes are possible in other embodiments. In an additional embodiment, the permeable shaping tool 20 comprises a roller 26 that rotates to facilitate movement of the porous medium 18, as will be described in more detail herein. The tool 20 is permeable so that the fluid matrix 12 containing nanofibers 14 will flow into and out of its interior. In addition, the tool 20 is hollow so that pressure within the interior of the tool 20 may be controlled to assist in the flow of the fluid matrix 12 containing nanofibers 14. Flow of the fluid matrix 12 may be accomplished in a number of ways, for example, by creating a pressure differential such that the pressure is higher on the outside than it is on the interior of tool 20. As a result, the fluid matrix 12 is pulled into the permeable shaping tool 20. Examples of such a "converging radial flow" set up are further illustrated and will be more fully described with reference to FIGS. 3 and 4, for example only and not by way of limitation. The converging radial flow is shown by direction arrows 24 in FIG. 3.

Figure 2:
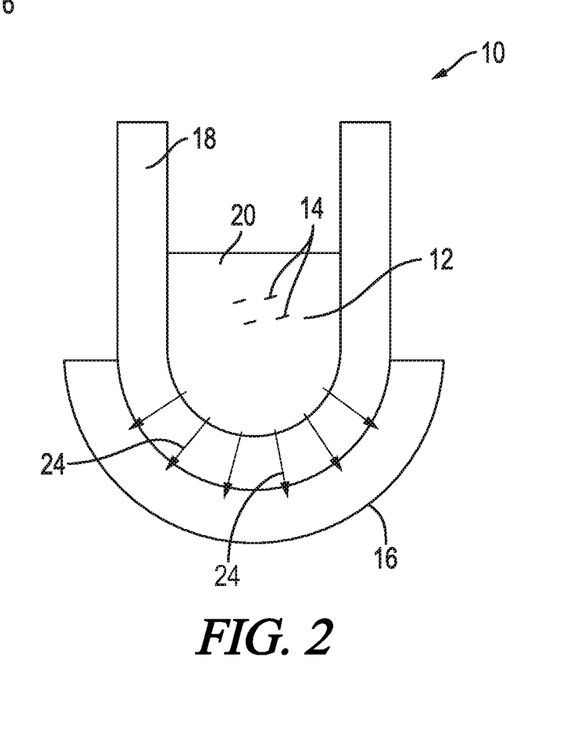
FIG. 2 is a schematic diagram of an additional embodiment of an apparatus for directional alignment of nanofibers in a porous medium in which the flow is diverging radial flow.

Referring now to FIG. 2, a "diverging radial flow" system is illustrated in which arrows 24 show the direction of the flow of the fluid matrix 12 from the interior of the permeable shaping tool 20 outward through porous medium 18. In this instance, the fluid flows "radially", as will be described and discussed more fully hereafter, into outer flow device 16. Outer flow device 16 may be any device for capturing fluid matrix 12 that passes completely through porous medium 18 such as, for example only and not by way of limitation. Examples of such "diverging radial flow" are further illustrated and will be more fully described with reference to FIGS. 5 and 6, for example only and not by way of limitation. Note that it is unnecessary to have an outer flow device 16 that contacts the porous medium 20. As an example, it is possible for the fluid matrix 12 to flow out of the porous medium without the use of the outer flow device 16 shown in the drawings.

Figure 3:
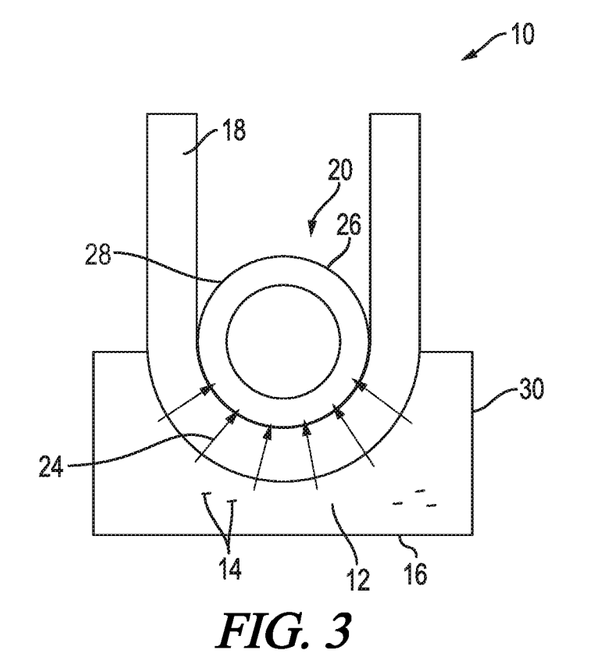
FIG. 3 is an additional embodiment of an apparatus for directional alignment of nanofibers in a porous medium.
Figure 4:
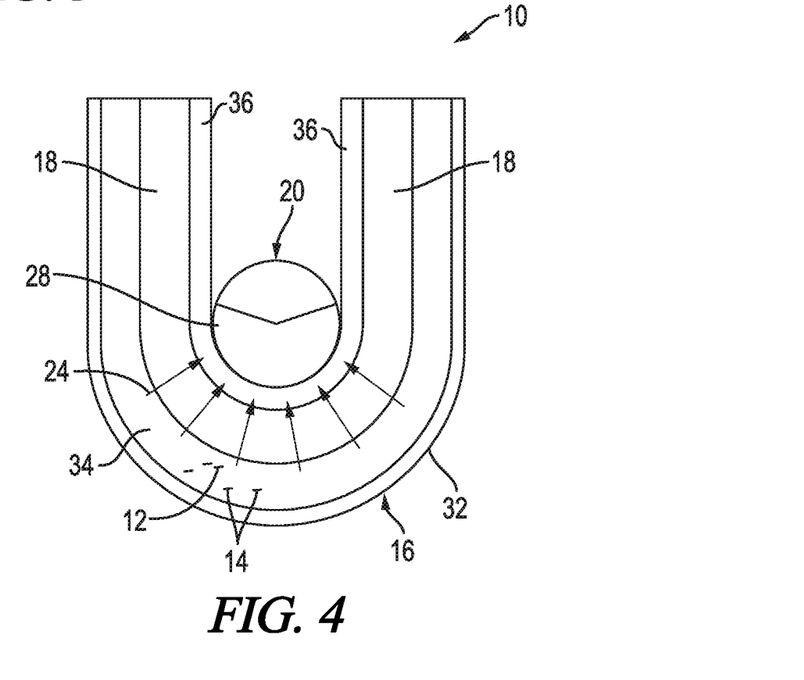
FIG. 4 is an additional embodiment of an apparatus for directional alignment of nanofibers in a porous medium.
Figure 12A:
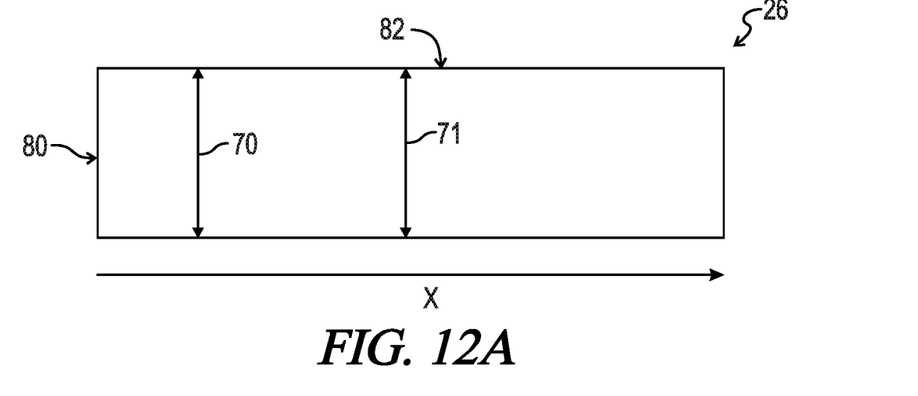
FIG. 12A is an illustration of a permeable shaping tool with a consistent width, as measured along the X-axis.
Figure 12B:
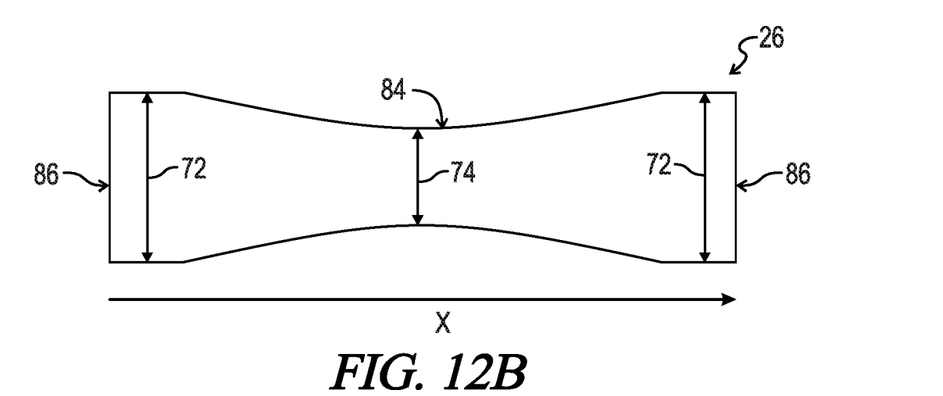
FIG. 12B is an illustration of a permeable shaping tool with a tapered width, as measured along the X-axis
Figure 12C:
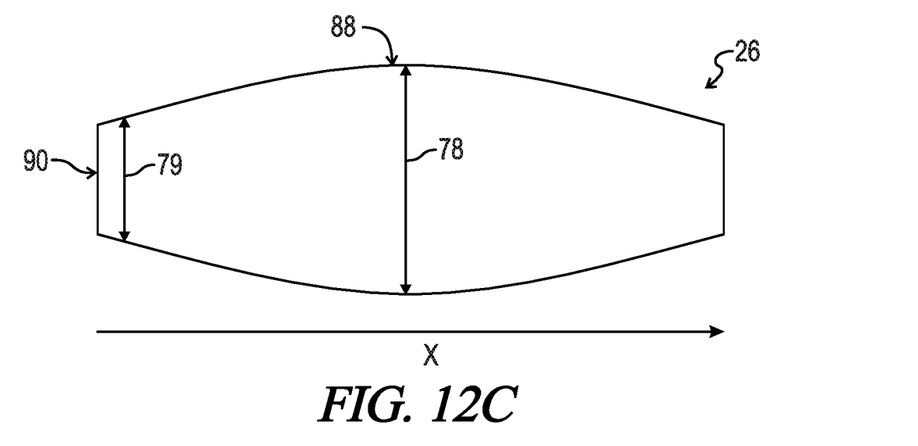
FIG. 12C is an additional illustration of a permeable shaping tool with a tapered width, as measured along the X-axis.

Referring now to FIGS. 3 and 4, two examples of converging flow systems are illustrated. FIG. 3 illustrates a permeable shaping tool 20 in the form of an arc-shaped roller 26. In any of the embodiments described herein as having a roller, it is to be understood that other types of shaping tools 20 could be used instead. Cylindrical in shape, arc-shaped roller 26 may be hollow and permeable, and the roller 26 has an outer surface that is curved (e.g., circular). In one embodiment, the radius of the arc-shaped roller 26 is constant (i.e., the tool 20 has a constant width) along its length. As illustrated in FIG. 12A, roller 26 has a width 70 near its end 80 that is approximately equal to the width 71 near its center 82. Specifically, the width is constant along the X-axis. In an additional embodiment, the cross section of the roller 26 can have different shapes, for instance a tapered configuration. In this embodiment the width varies along the X-axis. FIG. 12B illustrates a roller 26 with a width 74 near its middle 84 which is less that the width 72 near the ends 86. FIG. 12C illustrates an embodiment of a roller 26 with a width 78 near its middle 88 which is greater that the width 79 near end 90. A straight cylinder roller 26, for instance like the one illustrated in FIG. 12A, will align many of the nanofibers present in the fluid matrix 12. However, in some cases, this type of roller 26 might not align fibers 14 with an original alignment in the exact x-direction. This shortcoming may be addressed by a slight modification of the shape of roller 26. An alteration in the shape of roller 26 may change the alignment of the nanofibers 14 away from an exact x-direction and allow radial flow (illustrated in FIG. 12A) to provide further alignment. The tapered rollers 26 illustrated in FIG. 12B and FIG. 12C help to realign those nanofibers 14 originally orientated in the x-direction (see FIGS. 12A, 12B, 12C) and further align them through the radial flow of the inconsistently shaped rollers 26. FIGS. 12B and 12C illustrate an alternately shaped roller.

For the exemplary embodiments shown in FIGS. 1-6, porous medium 18 contacts the outer surface of the tool 20 and conforms to the arc 28. In so doing, "radial flow" is created, as will be described more fully hereafter. FIG. 3 shows that outer flow device 16 may comprise a tank or bath 30 that contains the fluid matrix 12 with nanofibers 14. Porous medium 18 is introduced into the tank 30 and is conformed around the arc 28 of hollow permeable roller 26. In this embodiment, tank 30 is pressurized so that the pressure in tank 30 is higher than the pressure in the interior of roller 26. As a result, a converging flow in the direction of arrows 24 flows from outer flow device 16 into the roller 26. Notably, the flow is a radial flow through the porous medium 18. The beneficial effects and results of the radial flow of the present disclosure will be discussed herein and in particular with reference to FIGS. 8, 9, 10 and 11.

Referring to FIG. 4, another example of a converging flow system of the present disclosure is illustrated in which outer flow device 16 comprises an impermeable layer 32. Impermeable layer 32 covers a layer 34, referred to herein as "impregnated layer," in which fluid matrix 12 has been included or "impregnated." In one example, layer 34 may be a sponge impregnated with a fluid matrix 12 including nanofibers 14. Impregnated layer 34 covers porous medium 18 which in turn covers a flow dispersion and absorption layer 36. In this instance flow dispersion and absorption layer 36 forms a part of the roller 26 which, in this embodiment, is arc-shaped. The exterior of roller 26 forms a curve around which each of these items is formed, thus creating the desired radial flow. The forces exerted onto impermeable layer 32 act to squeeze fluid matrix 12 with nanofibers 14 radially through porous medium 18. The excess fluid matrix is absorbed by flow dispersion and absorption layer 36. The forces exerted on the impermeable layer 32 may include, for example, a tension force applied by a mechanical apparatus that pulls the ends of impermeable layer 32. In an additional example, compression may be applied by feeding impermeable layer 32 through a die to push layer 32 around roller 26. Other types of forces are possible in other embodiment, for instance magnetic or an electrical force. The converging flow of the system is indicted by arrows 24.

Figure 5:
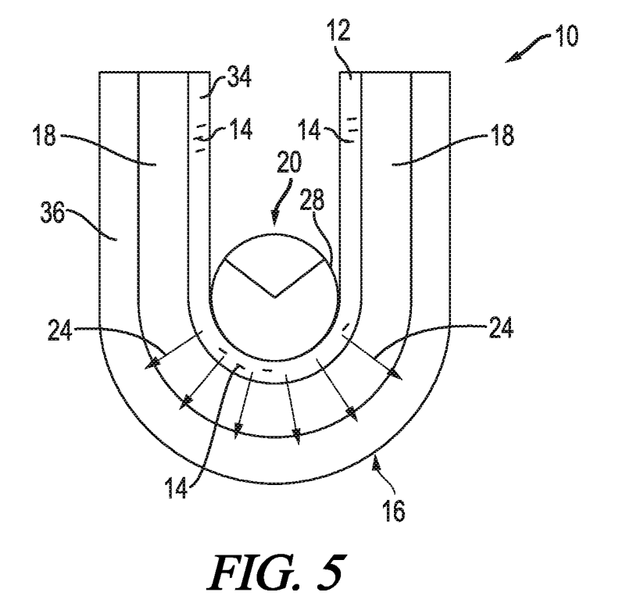
FIG. 5 is an additional embodiment of an apparatus for directional alignment of nanofibers in a porous medium.
Figure 6:
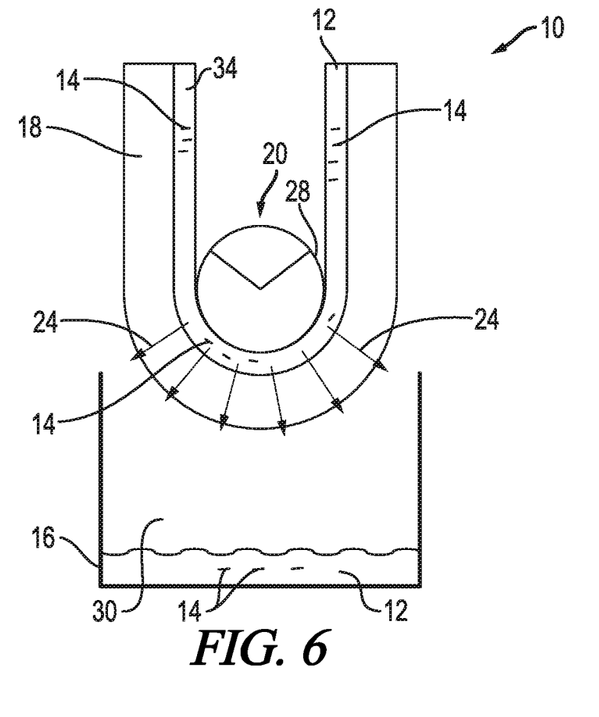
FIG. 6 is an additional embodiment of an apparatus for directional alignment of nanofibers in a porous medium.

Referring now to FIGS. 5 and 6, two examples of diverging flow systems are illustrated. In FIG. 5, shaping tool 20 is arc-shaped. In the embodiments shown by FIGS. 5 and 6, shaping tool 20 is implemented as a roller 26, but other types of tools 20 are possible in other embodiments. Impregnated layer 34 conforms to the radius of permeable shaping tool 20, as described above, which contains fluid matrix 12 containing nanofibers 14. Porous medium 18 is conformed to the impregnated layer 34. In this embodiment, the outer flow device 16 comprises a flow dispersion and absorption layer 36. The diverging flow of the fluid matrix 12 from the shaping tool 20 radially through the porous medium 18 and into outer flow device 22 is shown by arrows 24.

FIG. 6 illustrates a diverging flow system in which the outer flow device 16 comprises a tank 30 for collecting excess fluid matrix 12 and nanofiber 14. Again, the diverging flow of the fluid matrix 12 from the shaping tool 20 radially from impregnated layer 34 through the porous medium 18 into outer flow device 16 is shown by arrows 24.

Figure 7:
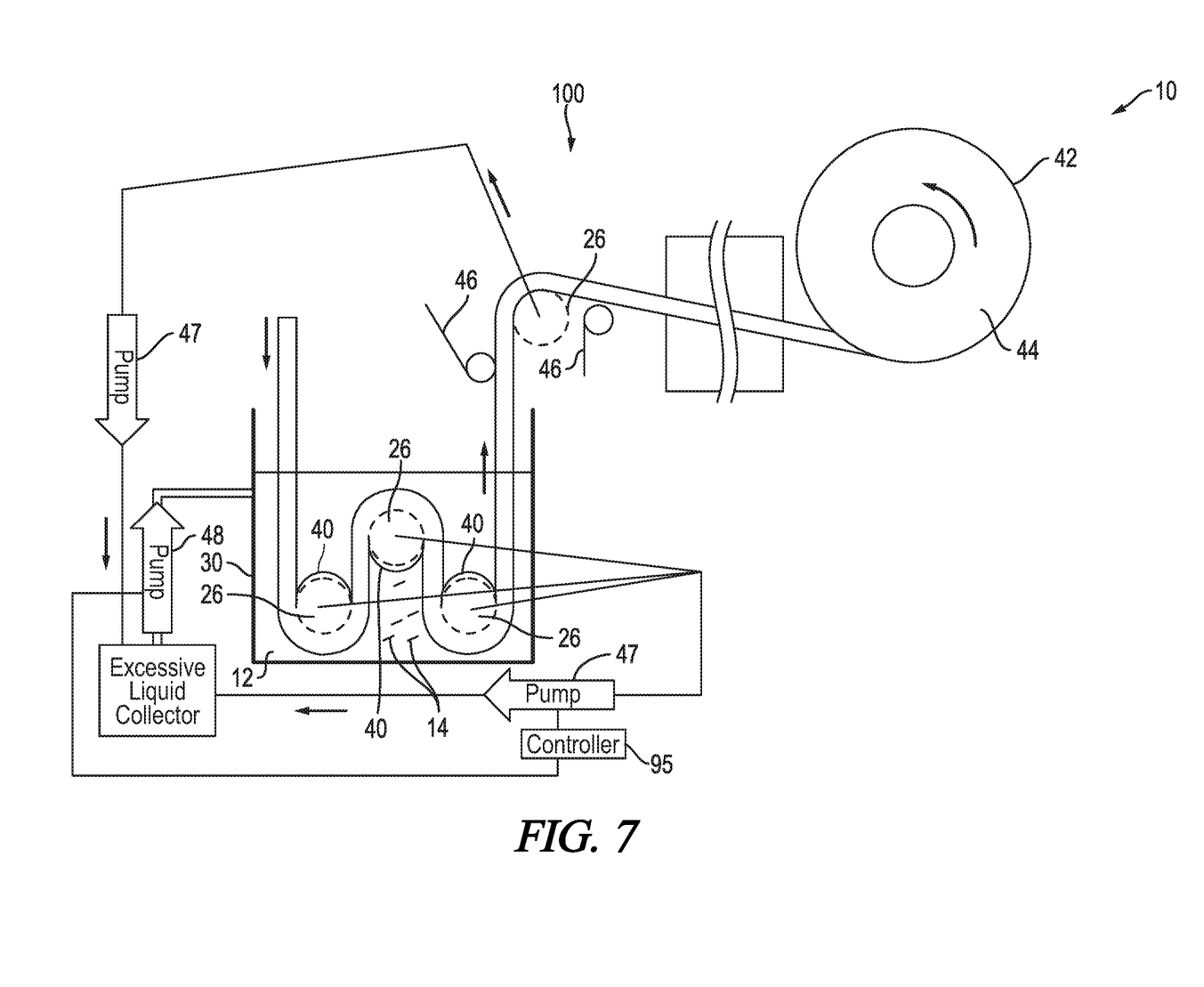
FIG. 7 is a schematic diagram of a total system for creating directionally aligned nanofibers in a porous medium and for the collection of the impregnated porous medium.

Referring now to FIG. 7, an exemplary system 100 for creating a prepreg of directionally aligned nanofibers 14 in a porous medium is shown for the purpose of example only and not by limitation. In this exemplary system, the apparatus for directional alignment of nanofiber in a porous medium 10 includes a source 30 for holding the fluid matrix 12 with nanofibers 14. In this embodiment, source 30 comprises a tank. A porous medium 18 is introduced into tank 30 and comes into contact with at least one shaping tool 20. In one embodiment, the shaping tool 20 is a hollow perforated arc-shaped roller 26. In an additional embodiment, the arc-shaped roller 26 has a constant radius and therefore width, along its length. In an additional embodiment, the cross section of the roller 26 can have different shapes, for instance a tapered configuration, as described previously with reference to FIGS. 12B an 12C. Porous medium 18 may be wet, dry or some combination prior to introduction into tank 30. FIG. 7 shows three hollow perforated rollers 26 and a porous medium 18 which serpentines around them. Covers 40, either impermeable or semi-impermeable, partially cover the hollow perforated roller 26 thus ensuring that fluid matrix 12 is forced radially through porous medium 18 from both sides. Upon exiting tank 30, the porous medium 18 containing nanofibers 14 is collected on collector 42 in the form of a "prepreg" 44.

It is further shown that upon exiting the tank 30 the porous medium 18 containing nanofibers 14 may be passed over another hollow perforated roller 26 or squeezed in order to remove excess fluid matrix 12. Additionally, protective film 46 may be added to fluid matrix 12 impregnated porous medium 18 prior to collection on collector 42.

In an additional embodiment, system 100 may include a control mechanism 95. The control mechanism 95 is configured to control at least one pump 47, which is connected to the roller 26 in order to control a pressure within the roller 26. Specifically, the pump 47 is connected to the hollow perforated arc-shaped roller 26 for controlling the pressure within the roller, thereby controlling the flow of fluid matrix 12 containing nanofibers 14. In one embodiment, the control mechanism 95 receives user input to set the desired pressure within the interior of the roller 26. In the embodiment depicted by FIG. 7, the control mechanism may be implemented in software, firmware, hardware, or any combination thereof. As an example, the control mechanism 95 may be a computer (e.g., a desktop or laptop) or a hand-held device, such as a smartphone.

In an additional embodiment, control mechanism 95 may control the pressure inside of a second pump 48 which is connected to tank 30. The pump 48, under the direction and control of the control mechanism 95, controls the pressure within the source (e.g., tank 30) to assist with the control of radial flow. Specifically, the pressure difference between the pressure of the tank 30, as controlled by pump 48, and the pressure within the roller 26, as controlled by pump 47, induces flow of the fluid matrix 12 through the porous medium 18. In this embodiment, tank 30 may be sealed (not shown) to provide for the generation of a more efficient vacuum. The use of both pumps 47 and 48 allows for the control of the pressure in both the interior of roller 26 and the exterior tank 30. Control of the pressure in the interior of roller 26 will provide pressure control within the porous medium 18 in at least the region that conforms to the surface of the roller 26. This ultimately allows for control of the flow of the liquid matrix 12 into and out of the porous medium 18. Indeed, the difference in pressures applied by the pumps 47 and 48 controls the rate at which the liquid matrix flows through the porous medium 18. However, control of both pressure sources, i.e. pumps 47 and 48, is unnecessary as long as there is a sufficient pressure differential to induce flow of fluid matrix 12 through the porous medium 18. As an example, it is possible to use the pump 47 without the presence of the pump 48 to control the pressure within the roller 26, thereby controlling the direction and rate of the flow of liquid matrix. Note that the pumps 47 and/or 48 may be similarly used to control pressure differential and the flow of liquid matrix for other types of shaping tools, including any of the embodiments specifically described herein.

Figure 8:
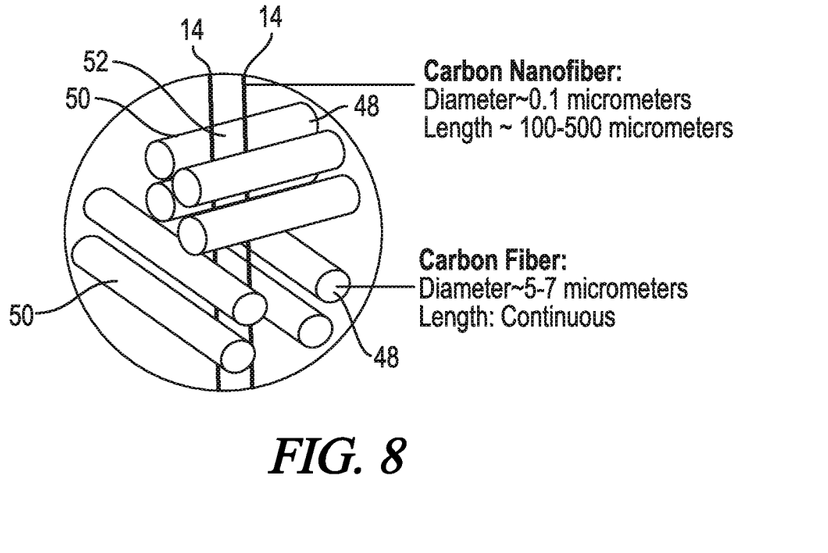
FIG. 8 is an enlarged view of common X-Y plane carbon fiber in which nanofiber has been inserted in accordance with the disclosure in the Z direction

Referring now to FIG. 8, the intended effect and result of the radial flow of fluid matrix 12 through porous medium 18 is illustrated. Here the porous medium 18 comprises a carbon fiber medium comprising carbon fibers 48 oriented in the X-Y plane 50. Carbon nanofibers 14 are shown driven through the porous medium 18 in the Z direction 52.

Figure 9:
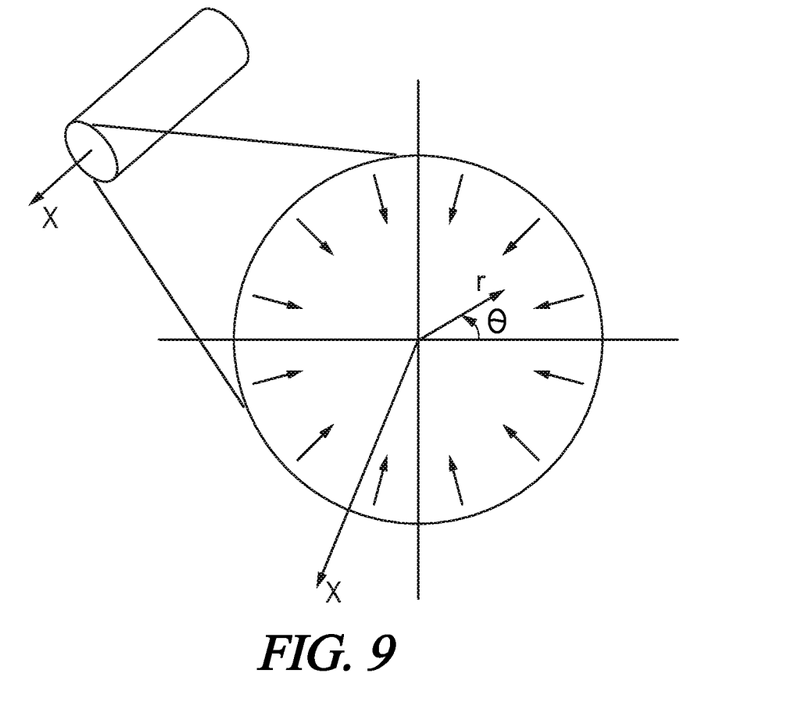
FIG. 9 is a schematic diagram illustrating the direction and the (r,θ,x) cylindrical coordinates of radial flow when the flow is converging radial flow.
Figure 10A:
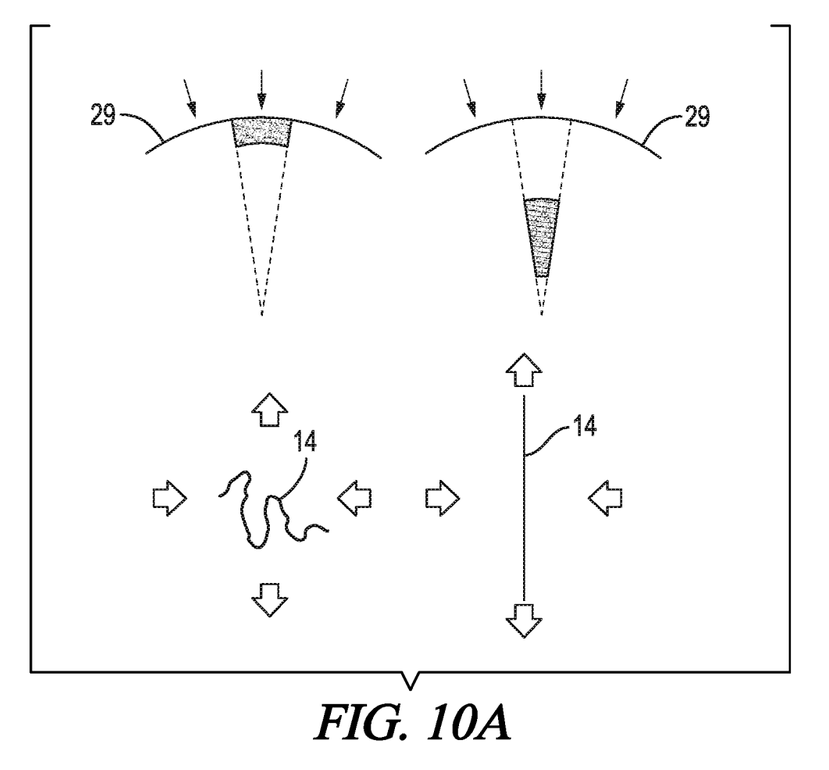
FIG. 10A is an illustration of the aligning effect a converging radial flow has on nanofibers.
Figure 10B:
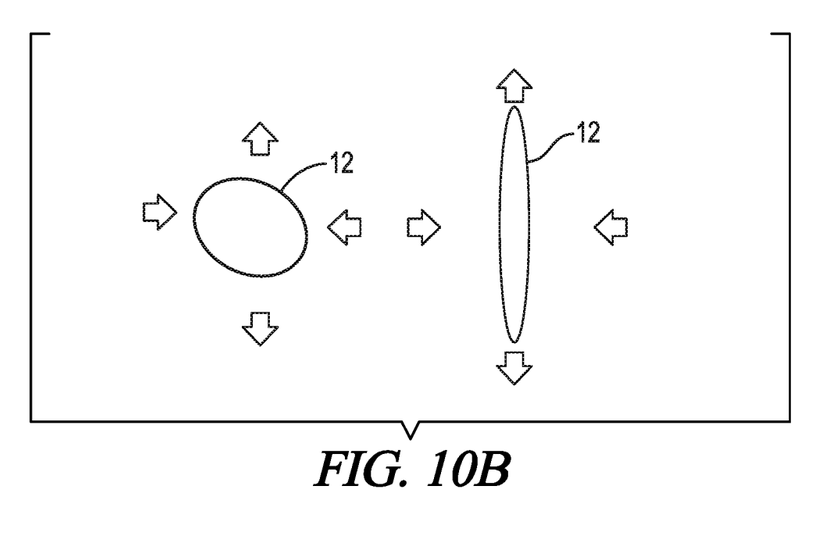
FIG. 10B is an illustration of the stretching effect a converging radial flow has on nanofibers.
Figure 11A:
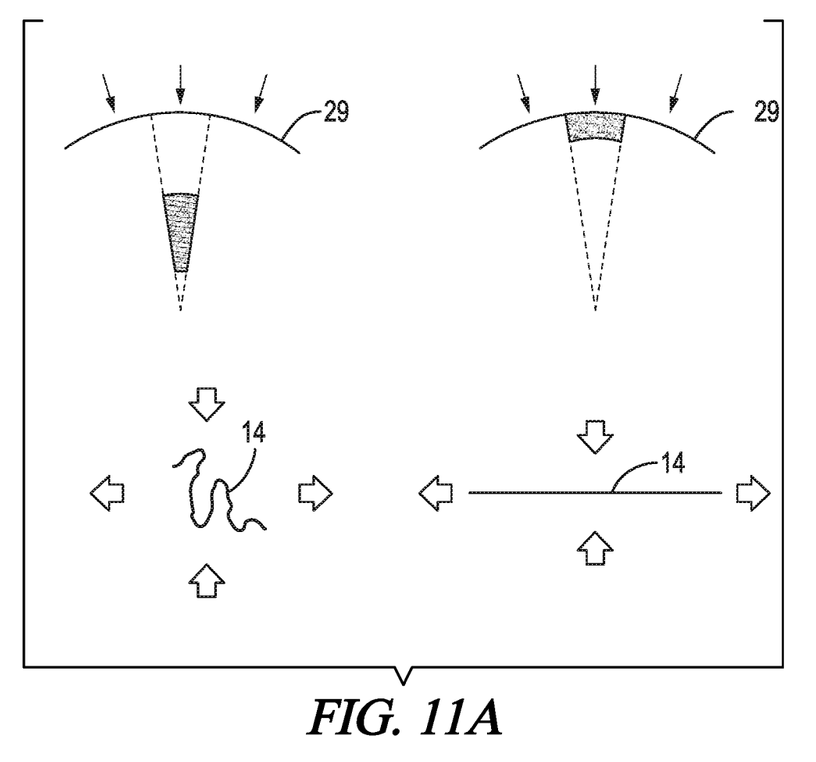
FIG. 11A is an illustration of the aligning effect a diverging radial flow has on nanofibers.
Figure 11B:
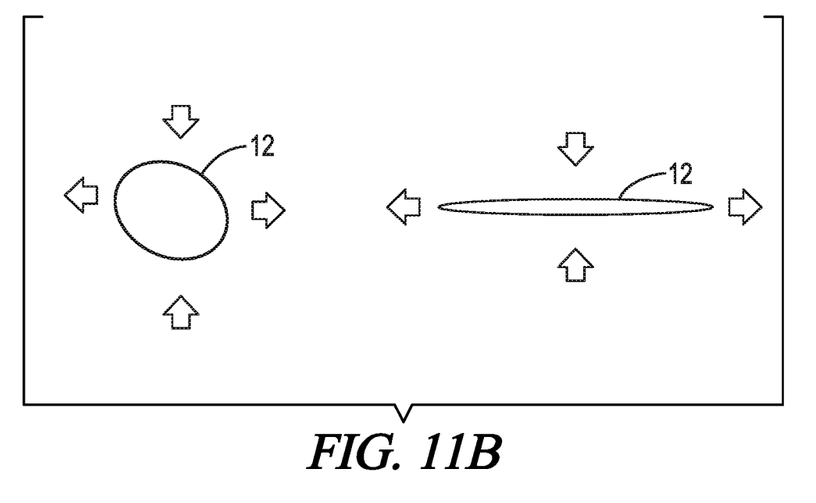
FIG. 11B is an illustration of the stretching effect a diverging radial flow has on nanofibers.

FIG. 9 illustrates that radial flow, as the term is used herein, primarily flows along its radial direction in the cylindrical coordinates. FIG. 9 shows a converging radial flow toward the center of the cylindrical coordinates. FIGS. 10A and 10B show a converging radial flow, i.e., a radial flow toward the inner side of a circle with an arbitrary radius in the cylindrical coordinates shown in FIG. 9 and the radial coordinate in the cylindrical coordinate system indicated by 29. The converging radial flow stretches (FIG. 10B) and aligns (FIG. 10A) both the nanofiber 14 and fluid matrix 12 in the radial direction. Conversely, FIGS. 11A and 11B show a diverging radial flow, i.e., a radial flow toward the radial coordinate in the cylindrical coordinate system indicated by 29, which stretches (FIG. 11B) and aligns (FIG. 11A) the nanofiber 14 and the fluid matrix 12 in the tangential direction.

By way of continued explanation, it is known that nanofibers (including but not limited to carbon nanofibers, carbon nanotubes, and long-chain polymer molecules) in a liquid can be rotated by the shear flow such as a simple extrusion process (i.e., extruding rods made of polymer melt containing nanofibers). Specifically, the alignment of nanofibers will be affected by the liquid flow. However, it has been unclear to researchers how to align nanofibers in porous media. Since the flow behavior in porous media is significantly more complicated than the shear flow in a simple extrusion process, the past efforts by many researchers to align nanofibers in porous media have been unsuccessful. This disclosure is based on a unique rheology configuration, which can continuously and robustly align and stretch the liquid particles in a consistent direction. The alignment and stretching effects based on this unique rheology configuration are strong enough to show the dominating power even being used in the flow through a porous media 18. When the nanofibers 14 are dispersed in the fluid matrix 12 (thermoset resin, molten metal, thermoplastics, etc.), the nanofibers 14 will also be aligned and stretched by the liquid flow. The unique rheological flow aligns and stretches the nanofiber 14 in the through-thickness direction (namely, the z-direction) of the porous medium 18 during the wetting process. That is, the nanofiber 14 will be aligned and stretched in the through-thickness direction inside the porous medium 18. Then the porous medium 18 containing z-aligned and stretched nanofibers 14 may require further collection and packaging steps, as described above, depending on the application of the porous medium 18 product. For the case of a composite prepreg 44 manufacturing application, the microfiber fabric (porous medium 18) containing z-aligned and stretched nanofibers 14 (e.g., carbon nanotubes) will require an appropriate temperature control cycle to turn the fluid matrix 12 into either gel or solid or visco-elastic materials depending on the type of the matrix material. Thus the z-aligned nanofiber enhanced microfiber reinforced composite prepreg 44 is formed and ready for packaging and shipping. Such a composite prepreg 44 can then be used for fabricating composite laminate parts by many popular composite manufacturing processes, such as an autoclave-vacuum bag method, a hot pressing method, etc. The concept of the manufacturing process for the z-aligned nanofiber (or nanotubes or nanowires) enhanced micro-fiber reinforced composite prepreg (i.e., porous layer) is shown in FIG. 7.

By way of further explanation, the theoretical velocity solution of the unique toward-center flow (converging flow) for a liquid in a cylindrical coordinates $(x,r,\theta)$ (see FIGS. 9, 10, and 11) can be written as:

$$u_r = \frac{-Q}{2\pi r l} \quad (1)$$

$$u_x = 0 \quad (2)$$

$$u_\theta = 0 \quad (3)$$

where $u_r$, $u_x$, $u_\theta$ are the velocity components in x, r, $\theta$ directions, respectively. The symbol 'l' represent the length of the cylinder. Note that "−Q" denotes the total flow rate flowing toward the center. (See FIGS. 9, 10A and 10B)

The components of the rate of strain tensor for the given flow field are:

$$\dot{\gamma}_{rr} = \frac{+Q}{\pi r^2 l} \quad (4)$$

$$\dot{\gamma}_{\theta\theta} = \frac{-Q}{\pi r^2 l} \quad (5)$$

$$\dot{\gamma}_{xx} = 0 \quad (6)$$

$$\dot{\gamma}_{r\theta} = 0 \quad (7)$$

$$\dot{\gamma}_{\theta x} = 0 \quad (8)$$

$$\dot{\gamma}_{xr} = 0 \quad (9)$$

The only two non-zero components are $\dot{\gamma}_{rr}$ and $\dot{\gamma}_{\theta\theta}$. Equation (4) gives a positive strain rate $\dot{\gamma}_{rr}$, which indicates the liquid particle at that space is under a tensile strain rate in the radial direction (r-direction). As a result, the fluid matrix 12 and the nanofiber 14 will be aligned and stretched in the radial direction (r-direction). Equation (5) gives a negative strain rate $\dot{\gamma}_{\theta\theta}$, which indicates the liquid particle at that space is under a compressive strain rate in the θ direction. As a result, the fluid matrix 12 and the nanofiber 14 will be compressed in the θ direction. Combining the flow strain rate effects described by Equation (4) and Equation (5), the nanofiber 14 (and the liquid particle contained in fluid matrix 12) will be effectively stretched and aligned in the r-direction as illustrated in FIGS. 9, 10A and 10B.

Referring to FIG. 9, the r-direction of the permeable (i.e., perforated) shaping tool 20, or roller 26, is in the z-direction 52 (through-thickness direction) of the porous layer 18 (e.g., microfiber fabric). As the liquid 12 flows from the source through the microfiber fabric, i.e. porous medium 18, and then toward the center of the permeable hollow cylinder arc-shaped roller 26, for example, the nanofibers 14 will be carried into the microfiber fabric porous medium 18 by the flow ($u_r$) and simultaneously stretched and aligned by the strain rate tensor ($\dot{\gamma}_{rr}$ and $\dot{\gamma}_{\theta\theta}$). Note that both the magnitudes of $\dot{\gamma}_{rr}$ and $\dot{\gamma}_{\theta\theta}$ are proportional to $1/r^2$. Therefore, the alignment and stretch effects will be significantly increased if the permeable hollow cylinder roller 26 has a smaller radius.

On the other hand, the magnitude of the $u_r$ is proportional to 1/r. This means that at a given flow rate Q, the speed the nanofiber 14 and fluid 12 flow through the microfiber fabric 18 will be increase when the roller 26 has a smaller radius. However, Applicant has determined that the speed increase won't be as significant as the stretch and alignment effects. All the effects will be proportional to flow rate Q. These relationships provide the flexibility to optimize the roller 26, diameter and the flow rate for different material systems. Note that these flow effects will also work well when the fluid matrix 12 and nanofibers 14 flow through the space among microfibers 48 inside the porous medium 18. The overall flow behavior contributed from all major flow channels (i.e., the open spaces with the local liquid speed similar to or higher than the volume-average speed of the liquid near the neighboring space) inside the porous medium 18 follows the same converging flow feature, which will always cause the compression in the θ direction, the alignment and stretch in the r-direction as described in Equation (4) and Equation (5).

Another optional feature of the present disclosure is that the outward-center flow (diverging flow), the nanofibers 14 and the fluid matrix 12 will be aligned and stretched in the θ direction (see FIGS. 11A and 11b). This optional feature may be useful for some applications that require the θ direction nanofiber alignment and stretching. This is easily achieved by simply reversing the flow direction of the setup shown in FIGS. 5 and 6, for example.

By way of continued explanation, the present disclosure pertains to a method of directionally aligning and/or stretching nanoparticle in a matrix-bearing porous layer (membrane, fabric, etc.) comprising the steps of: (a) establishing a nanoparticle dispersion in a source of fluid matrix containing nanofibers (the nanoparticle could be also long chain polymer, nanotube, nanofiber, nanorod, nano-sized elliptical shaped particles, or the like), and (b) contacting a porous layer 18, a membrane, fabric, etc., to a source with a shaping tool 20 with cylindrical or arc-shaped column tool surface which causes flow in the radial direction of the tool 20 so as to push the fluid matrix 12 through the porous medium 18. This radial flow stretches and aligns the nanofiber 14 in the preferred direction, the Z direction 52, inside the porous medium 18.

In other embodiments of the present disclosure, the radial flow can be either convergent radial flow or divergent radial flow. The convergent radial flow generally refers to the fluid matrix 12 flowing toward the shaping tool 20 along a radius of curvature of the shaping tool (See FIGS. 1, 3 and 4, for example). The divergent radial flow generally refers to the fluid matrix 12 flowing toward the outside of the cylindrical or arc-shaped column tool, tool 20 (See FIGS. 2, 5 and 6 for example). In another embodiment of the present disclosure, the convergent radial flow is particularly utilized to directionally align and/or stretch nanofibers 14 in a matrix-bearing porous medium 18 (membrane, fabric, etc.) along the radial direction of the shaping tool 20. In another embodiment of the present disclosure, the divergent radial flow is particularly utilized to directionally align and/or stretch nanofiber 14 in a matrix-bearing porous medium 18 (membrane, fabric, etc.) along the tangential direction of the shaping tool 20.

In addition, the present disclosure describes an apparatus for directionally aligning and/or stretching nanofibers 14 in a matrix-bearing porous medium 18 (membrane, fabric, etc.) comprising: (a) means for establishing a source of fluid matrix containing a nanofiber dispersion, where the nanofiber could be also long chain polymer, nanotube, nanofiber, nanorod, nano-sized elliptical shaped particles, or the like, and (b) means for contacting a porous medium 18 (membrane, fabric, etc.) with the fluid matrix source with a device with cylindrical or arc-shaped column tool surface which causes flow in the radial direction of the tool in order to push the fluid matrix 12 through the porous medium 18 (membrane, fabric, etc.). Note that the fed porous layer 18 can be dry, wetted, partially wetted, or partially filled with other contents, etc., as long as the fluid matrix 12 can still flow through. This radial flow is used to stretch and align the nanofiber 14 in the preferred direction inside the porous medium 18.

In one embodiment of the present disclosure, the device contains at least one hollow, permeable shaping tool 20, for example a roller 26, disposed longitudinally within a tank with fluid matrix 12. In this embodiment, the inner side pressure of the shaping tool 20 or roller 26 is different than the pressure of the fluid matrix 12 at the outer surface of the porous medium 18 (membrane, fabric, etc.), which is laid on the surface of the shaping tool 20, to cause the radial flow of the fluid matrix 12. In another embodiment, the disclosure relates to making the radial flow feasible in a variety of ways such as the inside of a shaping tool 20 may have a port or other similar flow mechanisms such as flow sink or flow source the that sucks out the fluid matrix 12 from the shaping tool 20 or, if desired, injects the fluid matrix 12 into the shaping tool 20.

In another embodiment of the present disclosure, said device is an arc-shaped shaping tool 20 that forces the fluid matrix 12 to penetrate the porous medium 18 (membrane, fabric, etc.) in the radial direction. In another embodiment of the present disclosure, the radial flow can be forced out from a sponge-like porous media, impregnated layer 34, containing the fluid matrix 12 against the porous medium 18 (membrane, fabric, etc.). In another embodiment of the present disclosure, the pressure difference to drive the radial flow of the fluid matrix 12 may be a static pressure difference. In another embodiment of the present disclosure, the pressure difference to drive the radial flow of the fluid matrix 12 can be caused by shear stress due to the flow motion.

As previously noted, the weaknesses related to matrix, fiber micro-buckling, and fiber/matrix interface are well-known shortfalls of the state-of-the-art composite laminate reinforced by microfibers, including the polymer matrix composites such as carbon fiber/epoxy composites, aramid/epoxy composites and the metal matrix composites such as boron/aluminum and graphite/magnesium. Recent developments in nanotechnology have resulted in the successful production of many different types of nanofibers such as carbon nanotubes (CNT), carbon nanofibers (CNF), and different kinds of nanowires. The present disclosure allows the dispersion and directional alignment of the nanofibers in the microfiber laminate and cures many traditional weaknesses of current composite materials. In accordance with Applicant's disclosure, microfibers will form a reinforcement network in the x-y plane 50 (in-plane direction) and the nanofiber 14 will penetrate the microfiber network, porous medium 18, and add reinforcement in the z-direction 52 (out-plane direction). This desired 3-D multiscale reinforcement structure (see FIG. 8) improves the mechanical properties, the thermal properties, and electrical properties of the laminate. Until now, however, there has been no existing method for robustly z-directionally aligning nanofibers 14 in the microfiber laminate.

Now, therefore, the following is claimed:

1. A method of directionally aligning nanofibers in a porous medium, comprising:
   establishing a source of a fluid matrix, the fluid matrix comprising a nanofiber dispersion;
   contacting the porous medium with the fluid matrix;
   positioning the porous medium against a permeable shaping tool, thereby causing the porous medium to at least partially conform to a curved surface of the permeable shaping tool;
   moving the porous medium around a center of curvature for the curved surface; and
   controlling a pressure within the permeable shaping tool thereby causing the fluid matrix to flow radially through the porous medium and the curved surface relative to the center of curvature such that nanofibers of the nanofiber dispersion within the porous medium are aligned by radial flow of the fluid matrix through the porous medium as the porous medium is moving around the center of curvature.

2. The method of claim 1, wherein the controlling comprises creating a pressure differential between pressure within the permeable shaping tool and a pressure of the source.

3. The method of claim 2, wherein the pressure within the permeable shaping tool is greater than the pressure of the source, thereby creating a divergent radial flow of the fluid matrix from the permeable shaping tool.

4. The method of claim 2, wherein the pressure within the permeable shaping tool is less than the pressure of the source, thereby producing a convergent radial flow of the liquid matrix towards the permeable shaping tool.

5. The method of claim 2, further comprising fluctuating the pressure differential such that the flow of the fluid matrix alternates between convergent and divergent flow.

6. The method of claim 1, wherein a ratio of the flow of the fluid matrix in a non-radial direction to the flow of the fluid matrix in a radial direction is less than 0.3.

7. The method of claim 1, further comprising producing a radial flow of the fluid matrix before the fluid matrix enters the porous medium.

8. The method of claim 7, wherein at least 70% of the radial flow occurs in a portion of the porous medium that conforms to the curved surface of the permeable shaping tool.

9. The method of claim 1, further comprising rotating the permeable shaping tool.

10. The method of claim 1, further comprising:
removing the porous medium from the source after the porous medium has been impregnated with the fluid matrix via the controlling; and
solidifying the fluid matrix within the porous medium after the removing.

11. A system, comprising:
a fluid matrix source comprising a nanofiber dispersion in a fluid matrix;
a permeable shaping tool;
a porous medium contacting a curved surface of the permeable shaping tool, wherein the system is configured to move the porous medium around a center of curvature for the curved surface; and
a first pressure source coupled to the permeable shaping tool and configured to control a pressure within the permeable shaping tool such that the fluid matrix is forced to flow radially through the porous medium and the curved surface relative to the center of curvature, wherein radial flow of the fluid matrix through the porous medium aligns nanofibers in the porous medium as the porous medium moves around the center of curvature.

12. The system of claim 11, wherein a pressure differential between the pressure within the permeable shaping tool and a pressure of the fluid matrix causes the fluid matrix to flow through the porous medium.

13. The system of claim 11, further comprising a second pressure source for applying pressure to the fluid matrix source.

14. The system of claim 11, wherein the pressure applied by the first pressure source within the permeable shaping tool is greater than a pressure of the fluid matrix, thereby creating a divergent radial flow of the fluid matrix from the permeable shaping tool.

15. The system of claim 11, wherein the pressure applied by the first pressure source within the permeable shaping tool is less than a pressure of fluid matrix, thereby producing a convergent radial flow of the fluid matrix towards the permeable shaping tool.

16. The system of claim 13, wherein the second pressure source for applying pressure to the fluid matrix source produces a pressure differential between the pressure within the permeable shaping tool and a pressure of the fluid matrix source.

17. The system of claim 11, wherein the permeable shaping tool rotates.

18. The system of claim 11, wherein the permeable shaping tool comprises an arc-shaped roller.

19. A method of directionally aligning and stretching nanofibers in a porous medium, comprising:
contacting the porous medium with a curved outer surface of a permeable shaping tool;
moving the porous medium around a center of curvature for the curved surface; and
controlling an internal pressure of the permeable shaping tool such that the internal pressure is different than an external pressure, thereby causing a radial flow of a fluid matrix comprising nanofibers through the porous medium and the permeable shaping tool relative to the center of curvature, wherein the radial flow of fluid matrix through the porous medium causes alignment of nanofibers within the porous medium as the porous medium is moving around the center of curvature.

20. The method of claim 19, further comprising fluctuating the internal pressure of the permeable shaping tool.

21. The method of claim 1, further comprising moving the porous medium relative to the permeable shaping tool while the fluid matrix is flowing through the porous medium in response to the pressure.

* * * * *